(12) United States Patent
Findeis et al.

(10) Patent No.: US 12,680,362 B2
(45) Date of Patent: Jul. 14, 2026

(54) TAILGATE ARRANGEMENT FOR A MOTOR VEHICLE AND METHOD FOR OPERATING A TAILGATE ARRANGEMENT

(71) Applicant: Bayerische Motoren Werke Aktiengesellschaft, Munich (DE)

(72) Inventors: Matthias Findeis, Geltendorf (DE); Maximilian Hartl, Anzing (DE); Jan Schieschang, Scheyern (DE); Tobias Vill, Dettingen an der Iller (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 415 days.

(21) Appl. No.: 17/913,929

(22) PCT Filed: Mar. 1, 2021

(86) PCT No.: PCT/EP2021/055024
§ 371 (c)(1),
(2) Date: Sep. 23, 2022

(87) PCT Pub. No.: WO2021/197734
PCT Pub. Date: Oct. 7, 2021

(65) Prior Publication Data
US 2023/0120356 A1      Apr. 20, 2023

(30) Foreign Application Priority Data
Mar. 31, 2020    (DE) ..................... 10 2020 108 934.1

(51) Int. Cl.
| | |
|---|---|
| *E05F 15/46* | (2015.01) |
| *B60J 5/10* | (2006.01) |
| *B60R 16/02* | (2006.01) |

(52) U.S. Cl.
CPC ................. *E05F 15/46* (2015.01); *B60J 5/10* (2013.01); *B60R 16/02* (2013.01);
(Continued)

(58) Field of Classification Search
CPC .. E05F 15/46; B60J 5/10; B60J 5/0418; B60J 10/25
See application file for complete search history.

(56) References Cited

U.S. PATENT DOCUMENTS

| | | | |
|---|---|---|---|
| 9,477,003 B2 | 10/2016 | Pribisic et al. | |
| 9,777,528 B2 * | 10/2017 | Elie .......................... | E05F 15/41 |

(Continued)

FOREIGN PATENT DOCUMENTS

| | | |
|---|---|---|
| CN | 105121261 A | 12/2015 |
| CN | 110036174 A | 7/2019 |

(Continued)

OTHER PUBLICATIONS

WO2020039665 English translation from WIPO (Year: 2020).*

(Continued)

*Primary Examiner* — Muhammad Ijaz
*Assistant Examiner* — Susan M. Heschel
(74) *Attorney, Agent, or Firm* — Crowell & Moring LLP

(57) ABSTRACT

A tailgate arrangement is provided for a vehicle, with a tailgate having a rear window and with at least one body component to which the rear window is adjacent when the tailgate is closed and from which the rear window is spaced apart further when the tailgate is open than when the tailgate is closed. A capacitive sensor is provided for monitoring a gap between the rear window and the at least one body component for presence of an object in the gap. At least one electrode of the capacitive sensor is arranged on the rear window. A method is provided for operating the tailgate arrangement for a motor vehicle.

9 Claims, 4 Drawing Sheets

(52) U.S. Cl.
CPC ....... *E05Y 2400/54* (2013.01); *E05Y 2600/41* (2013.01); *E05Y 2600/46* (2013.01); *E05Y 2900/546* (2013.01)

(56) References Cited

U.S. PATENT DOCUMENTS

| | | | | |
|---|---|---|---|---|
| 10,329,823 | B2 * | 6/2019 | Khan | E05F 15/46 |
| 10,501,008 | B2 * | 12/2019 | Snider | B60J 1/1884 |
| 11,522,543 | B2 * | 12/2022 | Salter | E05F 15/46 |
| 2005/0012484 | A1 | 1/2005 | Gifford et al. | |
| 2009/0146668 | A1 | 6/2009 | Wuerstlein | |
| 2016/0025520 | A1 | 1/2016 | Pribisic et al. | |
| 2017/0044813 | A1 * | 2/2017 | Pribisic | H03K 17/9645 |
| 2018/0230731 | A1 | 8/2018 | Nagao et al. | |
| 2019/0119965 | A1 * | 4/2019 | Hernandez | E05B 81/21 |
| 2020/0240855 | A1 * | 7/2020 | Bertrand | E05F 15/46 |

FOREIGN PATENT DOCUMENTS

| | | | |
|---|---|---|---|
| DE | 10 2007 001 712 A1 | 7/2008 | |
| DE | 102012010124 A1 * | 12/2012 | E05F 15/46 |
| DE | 10 2014 226 379 A1 | 6/2016 | |
| WO | WO 2011/038514 A1 | 4/2011 | |
| WO | WO-2020039665 A1 * | 2/2020 | B60J 5/107 |

OTHER PUBLICATIONS

DE102012010124A1 English translation from WIPO (Year: 2012).*

International Search Report (PCT/ISA/210) issued in PCT Application No. PCT/EP2021/055024 dated Apr. 30, 2021 with English translation (four (4) pages).

German-language Written Opinion (PCT/ISA/237) issued in PCT Application No. PCT/EP2021/055024 dated Apr. 30, 2021 (five (5) pages).

German-language Search Report issued in German Application No. 10 2020 108 934.1 dated Nov. 12, 2020 with partial English translation (12 pages).

German-language Office Action issued in German Application No. 10 2020 108 934.1 dated Dec. 17, 2021 (six (6) pages).

English translation of Chinese-language Office Action issued in Chinese Application No. 202180023139.6 dated Jan. 24, 2025 (9 pages).

* cited by examiner

TAILGATE ARRANGEMENT FOR A MOTOR VEHICLE AND METHOD FOR OPERATING A TAILGATE ARRANGEMENT

BACKGROUND AND SUMMARY

The invention relates to a tailgate arrangement for a motor vehicle, having a tailgate including a rear window and having at least one body component. When the tailgate is closed, the rear window adjoins the at least one body component. When the tailgate is open, the rear window is spaced apart farther from the body component than when the tailgate is closed. To monitor a gap between the rear window and the at least one body component for a presence of an object in the gap, a capacitive sensor unit is provided. Furthermore, the invention relates to a method for operating such a tailgate arrangement.

Introducing a capacitive sensor unit into a body-fixed seal, against which the tailgate of the motor vehicle presses when the tailgate is closed, is known from motor vehicle construction. It can be provided in this case that an electrode of the capacitor sensor unit is arranged in this body-fixed tailgate seal, while the object, which could be pinched between the seal and an edge of the tailgate upon closing of the tailgate, is used as the second electrode of the capacitive sensor unit.

It is disadvantageous here that, with such a structure of the capacitive sensor unit, electrically nonconductive objects cannot be detected. In other words, the gap between the edge of the tailgate and the body-fixed seal cannot be monitored for a presence of electrically nonconductive objects in this gap by means of such a capacitive sensor unit.

Furthermore, such an integration of an electrode of a capacitive sensor unit into the body-fixed seal for the tailgate is accompanied by very cumbersome cable routing. In particular, a division of the detection region into various sections is to be provided here, wherein separate electrical connections are necessary for each section. This makes the monitoring of the gap comparatively complex.

WO 2011/038514 A1 describes a method for preventing pinching of an object between a movable windowpane of a motor vehicle and a fixed frame of the windowpane. A capacitive sensor is arranged on the frame of the windowpane for this purpose. The sensor comprises a seal which is adhesively bonded to the frame. A first electrode and a second electrode of the capacitive sensor are arranged inside the seal. A change of a distance between the electrodes due to pinching of the object between the seal and the windowpane is detected on the basis of a change of an electrical resistance of the capacitive sensor or on the basis of a change of an electrical capacitance of the capacitive sensor.

The circumstance that integrating the electrodes of the capacitive sensor unit into the seal is comparatively complex is also to be considered disadvantageous here. Moreover, such a capacitive sensor unit is very sensitive with regard to a presence of dirt such as dust and/or leaves and/or of water in the region of the seal. This is because such substances or liquids also have an influence on the electrical variables detectable upon the use of the capacitive sensor unit.

It is the object of the invention to provide a tailgate arrangement of the type mentioned at the outset which enables particularly safe monitoring of the gap between the rear window and the body component, and to specify a corresponding method for operating such a tailgate arrangement.

This object is achieved by a tailgate arrangement and by a method having the features of the independent claims.

Advantageous embodiments of the invention are the subject matter of the dependent patent claims and the description.

A tailgate arrangement according to the invention for a motor vehicle comprises a tailgate, which includes a rear window. The tailgate arrangement furthermore comprises at least one body component, which the rear window adjoins when the tailgate is closed, and from which the rear window is spaced apart farther when the tailgate is open than when the tailgate is closed. The tailgate arrangement moreover comprises a capacitive sensor unit for monitoring a gap between the rear window and the at least one body component for a presence of an object in the gap. At least one electrode of the capacitive sensor unit is arranged on the rear window in this case.

This is based on the finding that if at least one electrode of the capacitive sensor unit for monitoring the gap is arranged in a body-fixed seal element, the electrode of the sensor unit is comparatively far away from the point at which pinching of the object between the rear window and the body component adjoining the rear window can occur. As a result, a presence of objects in the gap cannot be detected very reliably if the at least one electrode of the capacitive sensor unit is arranged in the body-fixed seal element.

In contrast, the gap between the rear window and the adjoining body component can be monitored particularly safely by arranging the at least one electrode of the capacitive sensor unit on the rear window itself. This is because when the at least one electrode, which also moves with the rear window upon movement of the open tailgate into a closed position, moves toward the at least one body component, the presence of an object in the gap can be detected particularly safely and reliably. This is because the at least one electrode is arranged in greater proximity to the measurement location.

The arrangement of the at least one electrode of the capacitive sensor unit on the rear window is thus accompanied by the at least one electrode of the capacitive sensor unit being located particularly close to the object to be measured or to be monitored, on the one hand. This contributes to the safe monitoring of the gap between the rear window and the body component.

Furthermore, a presence of electrically nonconductive objects in the gap can also be detected. In addition, such a capacitive sensor unit, in which the at least one electrode is arranged on the rear window, may be integrated particularly easily into the motor vehicle. This applies both to the connection of the at least one electrode to corresponding electrical lines for measuring the electrical properties of the sensor unit in dependence on the presence of the object and to the installation in the form of the attachment of the at least one electrode on the rear window.

Moreover, the arrangement of the at least one electrode on the rear window in particular enables the provision of a pinch protection in the region between the rear window and the body component adjoining the rear window, which can be designed as the rear side frame of the motor vehicle.

To monitor the gap between the rear window and the body component for the presence of an object in the gap when the tailgate is open, by applying a voltage, the at least one electrode arranged on the rear window and a counter electrode of the capacitive sensor unit can be brought to different electrical potentials. For example, the capacitance of a capacitor formed or charged in this way is then measurable. And the capacitance is dependent on the electrical properties of the object, such as a finger or a hand, which is located in the gap and thus in an electrical field generated by the electrodes of the capacitive sensor unit.

Depending on the type of the voltage applied to the electrodes of the capacitive sensor unit, a change of the capacitance of the sensor unit or a change of the value of an electrical resistance of the capacitor formed by the electrodes in dependence on the presence of the object can be measured and thus detected.

The at least one electrode is preferably arranged in an edge region of the rear window, which adjoins a narrow side of the rear window. In this case, the narrow side of the rear window faces toward the at least one body component when the tailgate is closed. In this way, an arrangement of the at least one electrode in particularly close proximity to the body component is achieved. Even an object which only protrudes slightly from the body component into the existing gap when the tailgate is open can thus be detected particularly reliably. Therefore, by arranging the at least one electrode in the edge region of the rear window, a particularly effective pinch protection can be provided.

An inner side of the rear window can face toward a seal element, which is held on the at least one body component, when the tailgate is closed. At least one part of the at least one electrode, viewed in the transverse direction of the rear window, is preferably arranged between the seal element and the at least one body component in this case. By way of such an arrangement of the at least one electrode on the rear window, in particular the region between the seal element and the body component may be monitored for the presence of objects in the gap. Since such objects could be pinched upon closing of the tailgate, this is particularly advantageous with regard to the safe monitoring of the gap.

This embodiment is based on the finding that if the at least one electrode of the capacitive sensor unit is arranged in the body-side seal element, the capacitive sensor unit is comparatively far away from the measurement location. This is because a gutter, via which precipitation water can drain off, for example, is typically present between the seal element and the body component, which the narrow side of the rear window faces toward when the tailgate is closed. If the at least one electrode of the sensor unit is arranged in the seal element, the distance of the sensor unit from the narrow side of the rear window is thus comparatively large.

Correspondingly, the point at which a detection of the presence of an object in the gap can take place is shifted by the width of the gutter toward an interior of the motor vehicle in the vehicle transverse direction or in the transverse direction of the rear window. As a result of this comparatively large distance of the at least one electrode from the object to be measured, the object to be measured can be detected comparatively poorly.

In contrast, a particularly small distance of the at least one electrode of the capacitive sensor unit from the measurement location can be achieved if at least the section of the at least one electrode, viewed in the transverse direction of the rear window, is arranged between the seal element and the body component.

It can be provided that one electrode of the capacitive sensor unit is provided by the at least one body component. For example, the at least one body component can have the ground potential of the body of the motor vehicle and can be used as the reference potential of the capacitor formed by the electrodes of the capacitive sensor unit. In particular, the body component can function as an electrical negative pole of the capacitor and accordingly the further electrode of the capacitive sensor unit arranged on the rear window can function as the electrical positive pole of the capacitor.

Since the glass of the rear window is not an electrical conductor, the application of positive charge to the electrode of the capacitive sensor unit arranged on the rear window, thus the bringing of the electrode arranged on the rear window to a higher electrical potential than the potential of the body component, causes the formation of an electrical field between the electrode on the rear window and the electrode provided by the body component. If an object is now introduced into this electrical field, the capacitance of the capacitive sensor unit comprising the two electrodes thus changes. A very simple structure of the capacitive sensor unit is achievable by the provision of one of the electrodes of the capacitive sensor unit by the at least one body component.

Additionally or alternatively, a first electrode of the capacitive sensor unit and a second electrode of the capacitive sensor unit can be arranged on the rear window. The charge separation to form the capacitor of the capacitive sensor unit takes place here in that the two electrodes arranged on the rear window are brought to different electrical potentials. If both the first (for example positive) electrode and the second (then negative) electrode of the capacitive sensor unit are located on the rear window, an electrical field which is influenced particularly little by a presence of water can thus be generated by the first electrode and the second electrode.

This is because it can thus be ensured in particular that the electrical field hardly extends into a gutter which is formed in the region of the body component. A presence of water in the gutter therefore also influences the electrical field formed between the first electrode and the second electrode particularly little. In other words, water possibly draining in the gutter remains particularly far away from the electrical field, so that an influence of water on the electrical field is particularly minor. This is accompanied by a particularly accurate measurement when monitoring the gap for the presence of an object in the gap.

The at least one electrode is preferably attached to an inner side of the rear window. The inner side is opposite to an outer side of the rear window, wherein the outer side faces toward the surroundings when the rear window is closed. In this way, the at least one electrode is protected particularly well by the rear window itself from possible damage.

Moreover, electrical conductors are often typically attached to the inner side or lower side of the rear window during the production of rear windows to provide, for example, a rear window heater and/or antenna functions. Thus, applying the at least one electrode of the capacitive sensor unit to the inner side of the rear window in addition to such electrical conductors is linked to particularly little effort.

The arrangement of the at least one electrode on the rear window can thus take place in particular in the same manufacturing step of the manufacturing of the rear window in which the at least one electrical conductor, for example for the rear window heater and/or the antenna function, is also attached to the inner side or lower side of the rear window. In comparison to an introduction of the at least one electrode between two layers of a rear window designed as a composite glass pane, the arrangement of the at least one electrode on the inner side of the rear window is moreover of particularly low effort.

The at least one electrode preferably extends in the vertical direction of the rear window along an entire part of the rear window, wherein a narrow side of the part faces toward the at least one body component when the tailgate is closed. In this way, the entire critical part of the rear window with regard to the pinching of an object can be monitored for the presence of an object in the gap. This contributes to providing a particularly extensive pinch protection.

Respective electrodes of capacitive sensor units of the tailgate arrangement are preferably arranged in a first edge region of the rear window and in a second edge region of the rear window. The second edge region is opposite to the first edge region viewed in the transverse direction of the rear window in this case. By providing the respective electrodes in the respective edge regions of the rear window, the two edge regions of the rear window opposite to one another in the transverse direction of the rear window can be monitored as to whether an object is located in the gap between the respective edge region of the rear window and the body component when the tailgate is open. A particularly comprehensive pinch protection is therefore achievable. When the tailgate is arranged on the motor vehicle, the transverse direction of the rear window extends in parallel to the vehicle transverse axis.

The tailgate arrangement preferably comprises a device for stopping the tailgate in an open position in dependence on a signal of the capacitive sensor unit. The signal indicates a presence of an object in the gap in this case. In this way, an effective pinch protection is provided by the tailgate arrangement.

In the method according to the invention for operating a tailgate arrangement for a motor vehicle, which has a tailgate having a rear window and at least one body component, the rear window adjoins the body component when the tailgate is closed. When the tailgate is open, the rear window is spaced apart farther from the body component than when the tailgate is closed. In the method, a gap between the rear window and the at least one body component is monitored for a presence of an object in the gap by means of a capacitive sensor unit. At least one electrode of the capacitive sensor unit arranged on the rear window is used in this case to monitor the gap for the presence of the object.

Such a method enables particularly safe monitoring of the gap present between the rear window and the body component when the tailgate is open for the presence of an object in the gap.

The advantages and preferred embodiments described for the tailgate arrangement according to the invention also apply to the method according to the invention and vice versa.

Further features of the invention result from the claims, the figures, and the description of the figures. The features and combinations of features mentioned above in the description and the features and combinations of features mentioned hereinafter in the description of the figures and/or shown solely in the figures are usable not only in the respective specified combination, but also in other combinations or alone.

The invention will now be explained in more detail on the basis of preferred exemplary embodiments and with reference to the drawings.

DETAILED DESCRIPTION OF THE DRAWINGS

Figure 1:
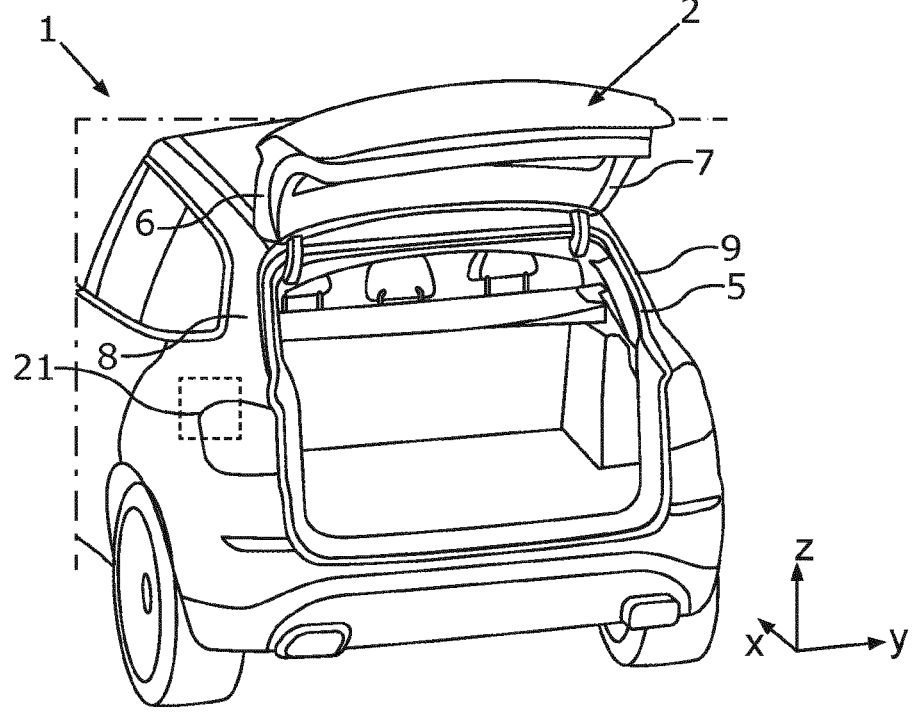
FIG. 1 shows, in a schematic illustration and in detail, a motor vehicle having an open tailgate.
Figure 2:
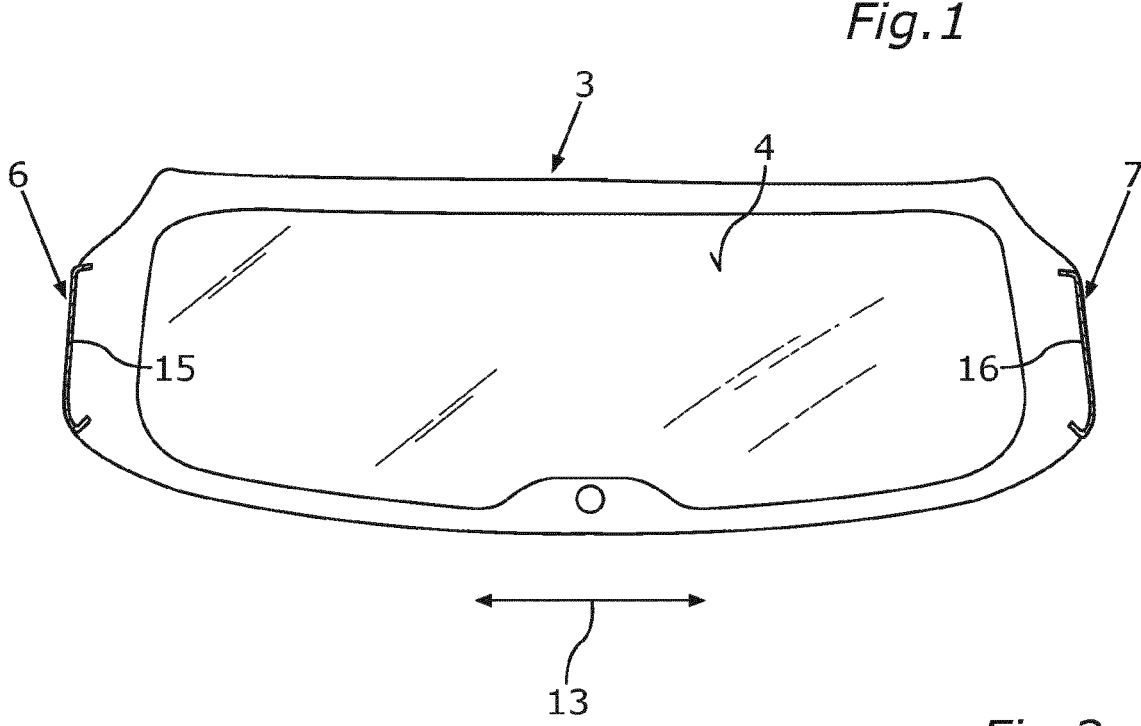
FIG. 2 schematically shows a rear window of the tailgate in a rear view, wherein the rear window has electrodes of a respective capacitive sensor unit in mutually opposing edge regions.

FIG. 1 shows, schematically and in detail, a motor vehicle 1 having an open tailgate 2. The tailgate 2 has a rear window 3, which is shown in FIG. 2 in a rear view, thus in a view toward an outer side 4 of the rear window 3. When the tailgate 2 is closed, the tailgate 2 presses against at least one seal element or against a seal 5, which is arranged fixed on the body and extends around an opening closable by the tailgate 2 (cf. FIG. 1).

In the present case, the tailgate 2 is designed in such a way that respective edge regions 6, 7 of the rear window 3 opposite to one another in the transverse direction of the rear window 3 (cf. FIG. 2) adjoin body components in the form of a left side frame 8 in FIG. 1 and a right side frame 9 in FIG. 1 when the tailgate 2 is closed.

Figure 4:
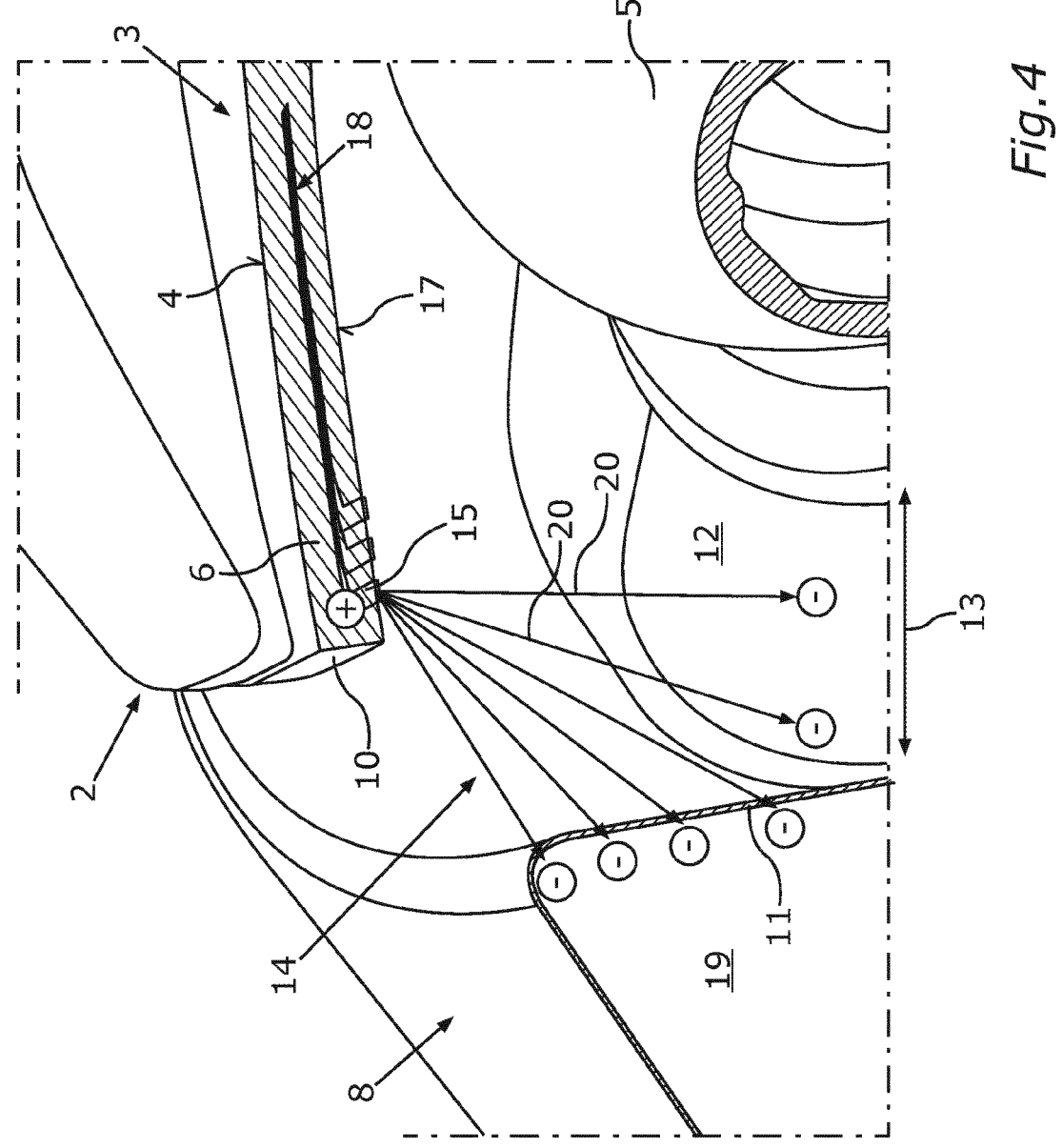
FIG. 4 shows a view in partial section of the rear window and the side frame of the motor vehicle adjoining the rear window when the tailgate is open, wherein one electrode of the capacitive sensor unit is arranged on the rear window and the other electrode is formed by the side frame.
Figure 5:
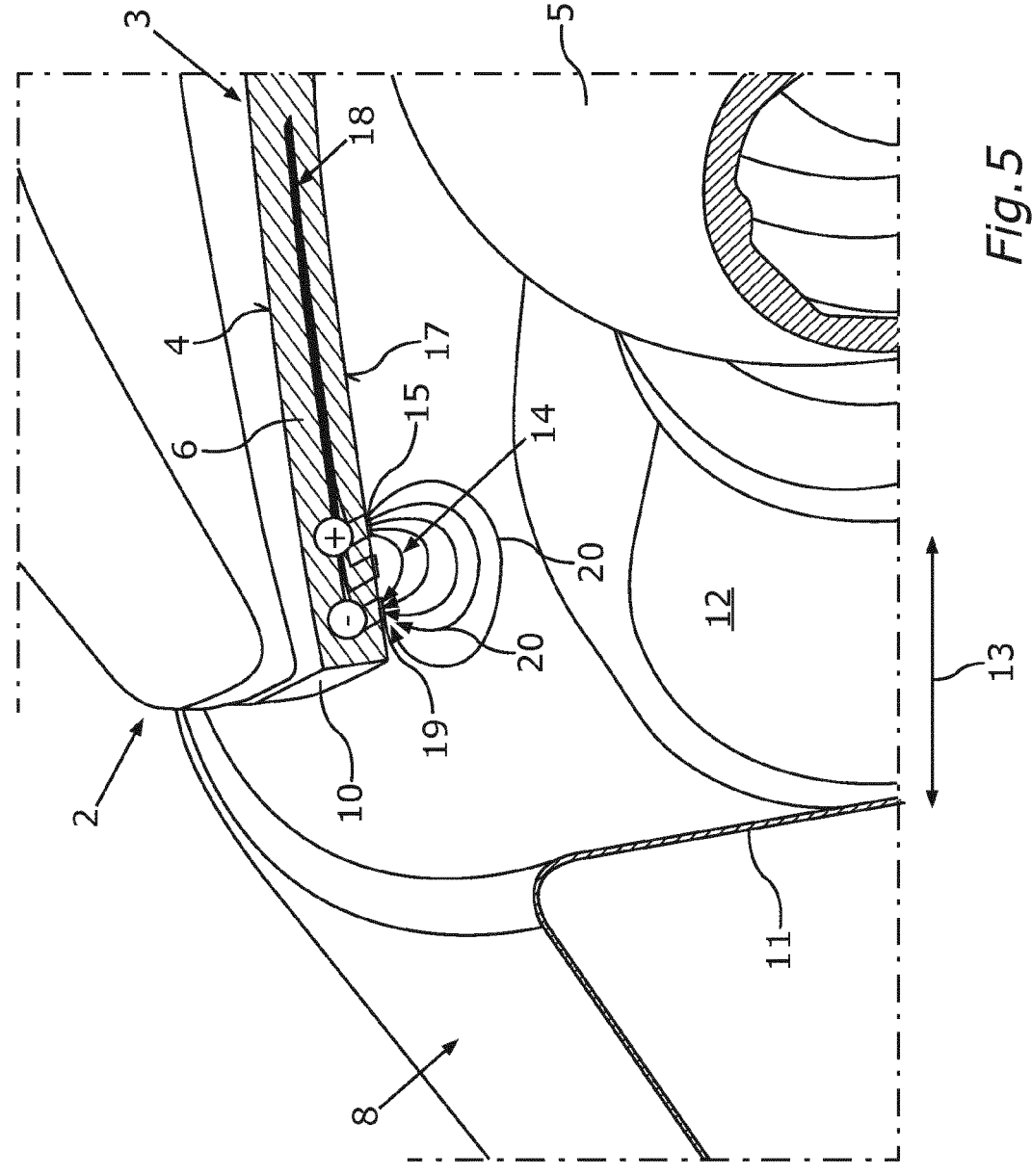
FIG. 5 shows a variant of the capacitive sensor unit according to FIG. 4, wherein both a first electrode and a second electrode of the capacitive sensor unit are arranged on the rear window.

The transverse direction of the rear window 3 is illustrated in FIG. 2, in FIG. 4, and in FIG. 5 by a double arrow 13. In the motor vehicle 1, this transverse direction of the rear window 3 extends essentially in parallel to the vehicle axis y of the motor vehicle 1. The vehicle transverse axis y is illustrated in FIG. 1 by a perpendicular coordinate system, as is the vehicle longitudinal axis x of the motor vehicle 1 and the vehicle vertical axis z of the motor vehicle 1. A pivot axis of the tailgate 2, around which the tailgate 2 is pivotable for opening, also extends essentially in parallel to the vehicle transverse axis y.

In FIGS. 4 and 5, the body component in the form of the left side frame 8 is shown in partial section and in perspective by way of example to illustrate the rear window 3 adjoining the at least one body component when the tailgate 2 is closed. Moreover, the seal 5 is shown enlarged and in partial section in FIGS. 4 and 5, which extends around the rearward opening of the motor vehicle 1 closable by means of the tailgate 2 (cf. FIG. 1).

In FIG. 4 (as also in FIG. 5), the tailgate 2 is shown in an at least partially open state. In contrast, when the tailgate 2 is closed, a narrow side 10 of the rear window 3 faces toward a wall 11 of the side frame 8. This wall 11 delimits a gutter 12 formed by the side frame 8 laterally or in the transverse direction of the rear window 3 (cf. FIG. 4 and FIG. 5). In other words, when the tailgate 2 is closed, the narrow side 10 of the rear window 3 is opposite to the wall 11.

In addition, when the tailgate 2 is closed, an unfinished component (not shown in FIG. 4 for reasons of clarity) of the tailgate 2 presses against the seal 5. The unfinished component of the tailgate 2, which is formed, for example, as a frame or inner panel of the tailgate 2, is used in particular for mounting the rear window 3.

In the present case, it is monitored by means of a capacitive sensor unit 14 whether, when the tailgate 2 is open, an object, such as a finger or a hand, is located in a gap between the respective edge region 6, 7 of the rear window 3 and the body component in the form of the respective side frame 8, 9. In this case, the capacitive sensor unit 14 or the capacitive sensor has at least one first electrode 15, which is arranged on the rear window 3.

A tailgate arrangement of the motor vehicle 1 comprises the tailgate 2 having the rear window 3, the at least one body component, in the present case in the form of the respective side frame 8, 9, and the capacitive sensor unit 14.

Figure 3:
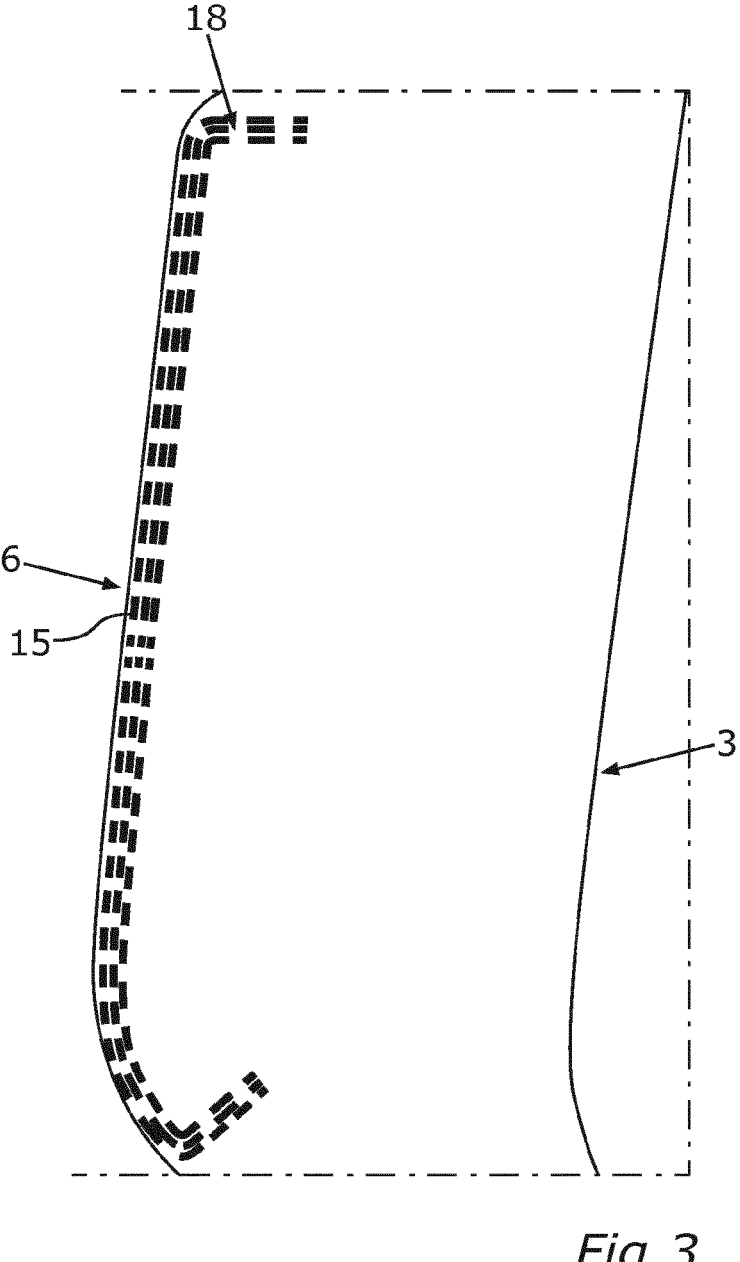
FIG. 3 shows one of the edge regions of the rear window having the electrodes in an enlarged, schematic detail view.

It is apparent from FIG. 2 in consideration together with FIG. 3 that respective first electrodes 15, 16 of respective capacitive sensor units 14 can be arranged on the edge regions 6, 7, which are opposite to one another in the transverse direction of the rear window 3. In the explanation of the functionality of the capacitive sensor unit 14 on the basis of FIG. 3 to FIG. 5, however, only the first electrode 15 arranged on the left edge region 6 in FIG. 2 or the first edge region 6 of the rear window 3 is discussed for the sake of simplicity.

It is first apparent from FIG. 3 that the first electrode 15 can be provided by conductor tracks, which are applied in the first edge region 6 to a lower side or inner side 17 of the rear window 3. The conductor tracks, which form the first electrode 15, extend here along an entire part of the rear window 3, the narrow side 10 of which faces toward the side frame 8 when the tailgate 2 is closed. Accordingly, it can be monitored over this entire part whether, during closing of the tailgate 2 (in particular effectuated by motor), an object is pinched between the edge region 6 of the rear window 3 and the adjoining side frame 8.

According to FIG. 3, the conductor tracks applied to the inner side 17 of the rear window 3 have a section 18 extending essentially in the transverse direction of the rear window 3, which is also shown in perspective in FIG. 4 and in FIG. 5.

In the variant of the capacitive sensor unit 14 shown in FIG. 4, a second electrode 19 of the capacitive sensor unit 14 is formed by the side frame 8. For example, the side frame 8 can have the electrical reference potential of zero of a capacitor of the capacitive sensor unit 14 having the first electrode 15 and the second electrode 19.

The first electrode 15 is brought to a different electrical potential in relation to this reference potential, which is shown in FIG. 4 as an electrical negative pole, in the form of the ground formed by the body of the motor vehicle 1. Accordingly, the first electrode 15 is shown as an electrical positive pole in FIG. 4. In this way, the capacitor of the capacitive sensor unit 14 comprising the first electrode 15 and the second electrode 19 can be charged.

Field lines 20, only a few of which are provided with a reference sign in FIG. 4 for the sake of simplicity, illustrate an electrical field of the capacitive sensor unit 14 generated by the charged capacitor.

If an object, such as a finger or a hand, is then introduced into the gap between the edge region 6 of the rear window 3 and the side frame 8 when the tailgate 2 is open, the capacitance of the sensor or of the capacitive sensor unit 14 thus changes.

This applies both when an electrically conductive object is introduced into the gap and when an electrically nonconductive object is located in the gap. The corresponding change of the capacitance of the sensor unit 14 can be detected by means of a measuring unit (not shown).

Preferably, a device 21, which is only shown schematically in FIG. 1 and also illustrated not faithfully to reality with regard to its arrangement in the motor vehicle 1 in FIG. 1, and by means of which the tailgate 2 may be stopped in an open position, is provided. By means of this device 21 of the tailgate arrangement, the stopping of the tailgate 2 in the open position is effectuated if the presence of an object is established in the gap between one of the edge regions 6, 7 of the rear window 3 and one of the side frames 8, 9. The device 21 is activated in dependence on a signal of the at least one capacitive sensor unit 14.

It is apparent from FIG. 4 that the field lines 20 extend in the region of the gutter 12 which is formed between the wall 11 of the side frame 8 and the seal 5. To keep an influence of water located in the gutter 12 on the detection of the object in the gap particularly low, a variant of the capacitive sensor unit 14, which is schematically shown in FIG. 5, can be used in the tailgate arrangement.

In this case, both the first electrode 15 and the second electrode 19 of the capacitive sensor unit 14 are provided by conductor tracks applied to the inner side 17 or lower side of the rear window 3. Accordingly, the electrical field, which is also schematically illustrated by field lines 20 in FIG. 5, is directed so that the electrical field is influenced particularly little by water possibly located in the gutter 12. In this way, measurement errors or measurement inaccuracies can be avoided particularly extensively.

In FIG. 5, the second electrode 19 is shown as an electrical negative pole of the capacitive sensor unit 14 and the first electrode 15 as the electrical positive pole of the capacitive sensor unit 14. The introduction of an object into the electrical field generated by the electrodes 15, 19 also causes a change of the capacitance of the capacitor here, which is formed by the electrodes 15, 19 set to different electrical potentials.

A voltage can be applied to the electrodes 15, 19 both in the variant shown in FIG. 4 and in the variant shown in FIG. 5 for charge separation and thus the bringing of the electrodes 15, 19 to different electrical potentials.

And both in the variant of the capacitive sensor unit 14 shown in FIG. 4 and in the variant of the capacitive sensor unit 14 shown in FIG. 5, a detection of objects in the respective edge region 6, 7 of the rear window 3 directly adjoining the narrow side 10 is possible.

This is because the at least one electrode 15, 19 arranged on the rear window 3 is located in very close proximity to the respective side frame 8, 9 and thus very close to the measurement field. The checking for a presence of objects in the region or gap to be monitored may thus be achieved particularly easily due to the attachment of the at least one electrode 15, 19 to the rear window 3.

It is apparent in particular in this regard from FIG. 4 and FIG. 5 that preferably at least the first electrode 15 (cf. FIG. 4) or the first electrode 15 and the second electrode 19 (cf. FIG. 5) are arranged, viewed in the transverse direction of the rear window 3, between the seal element or the seal 5 and the body component in the form of the respective side frame 8, 9. Objects which are located in the gap between the respective edge region 6, 7 and the side frame 8, 9 when the tailgate 2 is open can thus be detected better and more safely than would be the case with an arrangement of the electrodes of a capacitive sensor in the seal 5.

Overall, the examples show how a collision detection during the closing of the tailgate can be achieved by the invention via the capacitive sensor unit 14 in the rear window 3 or on the rear window 3.

LIST OF REFERENCE SIGNS

1 motor vehicle
2 tailgate
3 rear window
4 outer side
5 seal 6 edge region
7 edge region
8 side frame
9 side frame
10 narrow side
11 wall
12 gutter
13 double arrow
14 sensor unit
15 electrode
16 electrode
17 inner side
18 section
19 electrode
20 field lines
21 device
x vehicle longitudinal axis
y vehicle transverse access
v vehicle vertical axis

The invention claimed is:

1. A tailgate arrangement for a motor vehicle, comprising:
a tailgate including a rear window;
at least one vehicle body component, which the rear window adjoins when the tailgate is closed, and from which the rear window is spaced apart farther when the tailgate is open than when the tailgate is closed, the at least one body component including a gutter configured to drain water from the rear window; and
a capacitive sensor for monitoring a gap between the rear window and the at least one body component for a presence of an object in the gap, wherein
the capacitive sensor includes a first electrode and a second electrode,
the first electrode and the second electrode of the capacitive sensor are arranged at an outermost lateral edge of the rear window,
an inner side of the rear window faces toward a seal, which is held on the at least one body component, when the tailgate is closed,
at least a part of the first electrode and the second electrode, viewed in a transverse direction of the rear window, is arranged between the seal and the at least one body component, and
the first electrode and the second electrode are arranged on the inner side of the rear window such that an electric field generated by the first electrode and the second electrode remains outside of the gutter.

2. The tailgate arrangement according to claim 1, wherein the first electrode and the second electrode are arranged in an edge region of the rear window, which adjoins a narrow side of the rear window, and
the narrow side of the rear window faces toward the at least one body component when the tailgate is closed.

3. The tailgate arrangement according to claim 1, wherein the inner side of the rear window is opposite to an outer side of the rear window facing toward surroundings of the motor vehicle when the tailgate is closed.

4. The tailgate arrangement according to claim 1, wherein the first electrode and the second electrode extend along an entire part of the rear window in a vertical direction of the rear window, a narrow side of the rear window facing toward the at least one body component when the tailgate is closed.

5. The tailgate arrangement according to claim 1, further comprising:
a second capacitive sensor, wherein
respective electrodes of the first capacitive sensor of the tailgate arrangement are arranged in a first edge region of the rear window, and respective electrodes of the second capacitive sensor are arranged in a second edge region of the rear window,
wherein the second edge region is opposite to the first edge region viewed in a transverse direction of the rear window.

6. The tailgate arrangement according to claim 1, further comprising:
a device for stopping the tailgate in an open position in dependence on a signal of the capacitive sensor, which signal indicates a presence of an object in the gap.

7. The tailgate arrangement according to claim 1, wherein the first electrode and the second electrode comprise conductor tracks disposed on the inner side of the rear window.

8. The tailgate arrangement according to claim 7, wherein the conductor tracks include a section extending in a transverse direction of the rear window.

9. A method for operating a tailgate arrangement for a motor vehicle, which has a tailgate having a rear window and at least one vehicle body component, which the rear window adjoins when the tailgate is closed, and from which the rear window is spaced apart farther when the tailgate is open than when the tailgate is closed, the at least one body component including a gutter configured to drain water from the rear window, the method comprising:
monitoring a gap between the rear window and the at least one body component for a presence of an object in the gap via a capacitive sensor that includes a first electrode and a second electrode, wherein
the first electrode and the second electrode of the capacitive sensor are arranged at an outermost lateral edge of the rear window and are used to monitor the gap for the presence of the object,
an inner side of the rear window faces toward a seal, which is held on the at least one body component, when the tailgate is closed,
at least a part of the first electrode and the second electrode, viewed in a transverse direction of the rear window, is arranged between the seal and the at least one body component, and
the first electrode and the second electrode are arranged on the inner side of the rear window such that an electric field generated by the first electrode and the second electrode remains outside of the gutter.

* * * * *